3,839,464
Patented Oct. 1, 1974

3,839,464
BIS-(PARA-CHLOROPHENOXY)CARBINOL AND ETHERS THEREOF

Henry Najer and Jean-Francois Giudicelli, Paris, France, assignors to Synthelabo, Paris, France
No Drawing. Filed July 21, 1972, Ser. No. 273,969
Claims priority, application France, July 23, 1971, 26,965
Int. Cl. C07c 43/28
U.S. Cl. 260—613 R        10 Claims

ABSTRACT OF THE DISCLOSURE

Bis-(para-chlorophenoxy)carbinol and its alkyl, alkoxyalkyl, aminoalkyl, and aminoalkoxyalkyl ethers, and their salts, are useful for reducing the lipid content of the blood.

---

The present invention provides, as new compounds bis-(para-chlorophenoxy)-carbinol and its ethers of the formula:

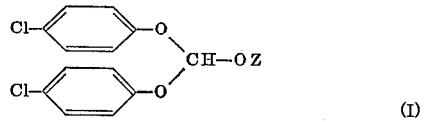

(I)

in which Z is a hydrogen atom, a straight or branched alkyl radical of 1 to 6 carbon atoms, an alkoxy-alkyl radical of formula —$(CH_2)_n$—$OR_1$ in which $n$ is an integer from 1 to 4 and $R_1$ is a straight or branched alkyl radical of 1 to 6 carbon atoms, an amino-alkyl radical of formula —$(CH_2)_n$—$NR_2R_3$, in which $n$ is an integer from 1 to 4 and $R_2$ and $R_3$ are identical or different and each represents a hydrogen atom or a straight or branched alkyl radical of 1 to 6 carbon atoms, or $R_2$ and $R_3$, together with the adjacent nitrogen atoms, form a heterocyclic structure which may or may not contain other hetero-atoms, such as piperidino, piperazino and morpholino rings and the like, or an amino-alkoxy-alkyl radical of formula —$(CH_2)_n$—$O(CH_2)_m$—$NR_2R_3$ in which $n$ and $m$ can be identical or different and each represents an integer from 1 to 4 and $R_2$ and $R_3$ are as hereinbefore defined, and the salts which the compounds of formula (I), in which the radical Z contains an amino group, form with pharmaceutically tolerated inorganic and organic acids.

The invention further provides a process for the preparation of the compounds of formula (I) according to which a bis-(para-chlorophenoxy)-halomethane of the general formula (II)

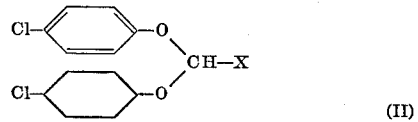

(II)

in which X is a halogen atom, and preferably a chlorine atom, is reacted with a compound of the general formula (III)

<div style="text-align:center">Z—OH     III</div> in which Z has the same meanings as in the general formula (I).

The reaction is preferably carried out in an inert organic solvent such as benzene, toluene, xylene, chloroform or ethyl ether, in the presence of a hydrogen halide acid acceptor such as triethylamine, at a temperature of between 0 and 20°, and preferably at about 15°, the duration of the reaction being a few hours to several days, and preferably approximately 48 hours.

Starting from the compound (I) in which Z=H, it is possible to prepare the esters which it forms with inorganic or organic acids. Amongst the latter, the most valuable in therapy are the nicotinic ester and the para-chlorophenoxy-isobutyric ester.

The invention also comprises a process for the preparation, by known methods, of the salts which the compounds (I) optionally form, depending on the meaning of Z, with pharmaceutically tolerated inorganic or organic acids.

The compounds (I) are colourless liquids with a high boiling point or solids with a low melting point which are insoluble in water and soluble in the usual organic solvents.

The invention finally comprises the industrial uses and more particularly the pharmaceutical uses of the compounds (I). The latter possess pharmacological properties which make them valuable in therapy. They reduce the lipid content of the blood and more especially its content of cholesterol, phospholipids and triglycerides. This action is observed experimentally in normal animals and in animals in which the lipid content in the blood is abnormally high.

Furthermore, the toxicity of the compounds (I) is very low, which imparts an advantageous therapeutic index to them.

By way of example, there is given below, for bis-(para-chlorophenoxy)-β-methoxy-ethoxymethane (the preparation of which is described in Example 6), denoted hereafter by "compound I/6": the 50 percent lethal dose (LD 50) when administered orally to Swiss mice: 4.1 (95% confidence limits: 3.63–4.64) g./kg.; the 50 percent effective dose (ED 50 in inducing hypocholesterolaemia) in normal Sherman rats (that is to say, the dose which decreases the normal cholesterolaemia of the rats by 50% after six consecutive days of treatment): 135 mg./kg.

By way of comparison, (1) The LD 50, administered orally, of clofibrate (ethyl 4-chlorophenoxy-isobutyrate) in Swiss mice is equal to 1.32 (95% confidence limits: 1.17–1.49) g./kg. and statistical calculation shows that the ratio of the LD 50's of compound I/6 and of clofibrate is equal to 3.1 (95% confidence limits: 2.4–4) in favour of the compound of the invention;

(2) The ED 50 of clofibrate in Sherman rats with normal cholesterolaemia is equal to 325 mg./kg.

In consequence, the compound I/6 is 2.4 times more active and 3.1 times less toxic than clofibrate, which is the compound generally considered as the reference in inducing hypocholesterolaemia. Thus, the therapeutic index of the compound I/6 is 7.5 times more favorable than that of clofibrate.

The action on plasma phospholipids and triglycerides is also very great. By way of example, the results of an experiment carried out on 40 male Sherman rats with normal cholesterolaemia, divided by drawing lots into four batches of 10 animals, are given below.

Batch number 1 acts as the reference.
Batch number 2 is treated with 135 mg./kg. per day of compound I/6, administered orally.
Batch number 3 is treated with 135 mg./kg. per day of clofibrate, administered orally.
Batch number 4 is treated with 250 mg./kg. per day of clofibrate, administered orally.

The animals in batches number 2, 3 and 4 are treated for six consecutive days. At the end of this period, the animals are killed and a sufficient amount of blood is removed to measure the phospholipids and the triglycerides. The results are given in the table below:

| Batch No. | Phospholipids (per thousand) | Triglycerides (per thousand) |
|---|---|---|
| 1 (reference) | 1.03 | 2.60 |
| 2 | 0.65 | 1.40 |
| 3 | 0.80 | 2.05 |
| 4 | 0.74 | 1.59 |

The experiments carried out with the other compounds of the invention have shown that each of them has a LD 50 which is greater than 3 g./kg. and that their hypocholesterolaemia-inducing activity manifests itself from a dose of 35 mg./kg., administered over six consecutive days to Sherman rats with normal cholesterolaemia, whilst clofibrate, administered at the same dose and under the same conditions, is practically inactive. The following table summarises these experiments.

| Compound:* | Fall in the plasma cholesterolaemia (percent) |
|---|---|
| I/1 | 27 |
| I/2 | 21 |
| I/3 | 33 |
| I/4 | 30 |
| I/5 | 29 |
| I/7 | 34 |
| I/8 | 26 |
| I/9 | 29 |
| I/10 | 33 |
| I/11 | 28 |
| I/12 | 25 |
| I/13 | 34 |
| I/14 | 30 |
| Clofibrate | 2 |

*The compounds of the invention listed above are denoted by I/ followed by the number of the example relating to their synthesis.

The therapeutic applications of the compounds (I) comprise principally their use in the treatment of the pathological conditions which are accompanied by hyperlipaemia and more particularly by hypercholesterolaemia, that is to say: In atheroma in its various forms such as coronary or cerebral circulatory disorders, arterites and arterial hypertension; in primitive hyperlipaemiae; and in essential hypercholesterolaemiae.

As a result, the invention comprises all pharmaceutical compositions containing one of the compounds (I) as the active principle, combined with any excipients which are appropriate to their liquid or solid state at ordinary temperature and which are suitable for their oral administration.

These pharmaceutical compositions can also contain other medicinal substances with which the compounds (I) are pharmaceutically and therapeutically compatible.

For oral administration, the pharmaceutical forms which are appropriate to this method of administration and to the liquid or solid state of the compounds (I) at ordinary temperature are used, namely capsules, elixirs, suspensions, gelatine-coated pills, tablets and the like, it being possible for a single dose to vary, depending on the compound (I) chosen, between 10 and 500 mg. and for the daily dose to vary between 60 and 3,000 mg.

The following examples illustrate the invention without implying any limitation with regard to its general scope.

Example 1.—Bis-(para-chlorophenoxy)-methoxy-methane

A solution of 13.75 g. (45 mmol/g.) of bis-(para-chlorophenoxy)-chloromethane and 6.2 g. (8.5 ml.) (60.5 mmol/g.) of triethylamine in 75 ml. of anhydrous ether is introduced into a 250 ml. three-necked flask, equipped with a mechanical stirrer, a condenser surmounted by a calcium chloride guard tube and a dropping funnel. 3.2 g. (4.1 ml.) (100 mmol/g.) of methanol which has been freshly distilled over barium oxide are added, with stirring, via the dropping funnel. The mixture is stirred for twenty-four hours at ambient temperature, 10 ml. of 35–70° petroleum ether are added, the triethylamine hydrochloride which has precipitated is filtered off and the solvents are evaporated from the filtrate in vacuo on a water bath. The residue is rectified in vacuo.

6.2 g. (yield=46%) of bis-(para-chlorophenoxy)-methoxy-methane, in the form of a colourless liquid which distils over a 162–163°/0.75 mm. and crystallises in the receiving flask, are thus obtained. Melting point=70°.

| Analysis $C_{14}H_{12}Cl_2O_3$ (299) percent | | | | | |
|---|---|---|---|---|---|
| Calculated | | | Found | | |
| C | H | Cl | C | H | Cl |
| 56.21 | 4.04 | 23.70 | 56.52 | 4.05 | 23.64 |
| | | | 56.21 | 3.88 | 23.58 |

Example 2.—Bis-(para-chlorophenoxy)-ethoxy-methane

Prepared in the same way as its lower homologue in Example 1, with a yield of 67%. Boiling point=156–158°/0.45 mm. Melting point=49°.

| Analysis $C_{15}H_{14}Cl_2O_3$ (313) percent | | | | | |
|---|---|---|---|---|---|
| Calculated | | | Found | | |
| C | H | Cl | C | H | Cl |
| 57.52 | 4.50 | 22.64 | 57.54 | 4.41 | 22.73 |
| | | | 57.58 | 4.31 | 22.60 |

Example 3.—Bis-(para-chlorophenoxy)-n-propyloxy-methane

Prepared in the same way as its lower homologue in Example 1, with a yield of 80%. Boiling point=163–164°/0.4 mm. $n_D^{25.5°}=1.5480$.

| Analysis $C_{16}H_{16}Cl_2O_3$ (327) percent | | | | | |
|---|---|---|---|---|---|
| Calculated | | | Found | | |
| C | H | Cl | C | H | Cl |
| 58.73 | 4.93 | 21.67 | 58.93 | 4.62 | 21.38 |
| | | | 58.97 | 4.70 | 21.32 |

Example 4.—Bis-(para-chlorophenoxy)n-butyloxy-methane

Prepared in the same way as its lower homologue in Example 1, with a yield of 81%. Boiling point=171–172°/0.45 mm. $n_D^{26°}=1.5427$.

| Analysis $C_{17}H_{18}Cl_2O_3$ (341) percent | | | | | |
|---|---|---|---|---|---|
| Calculated | | | Found | | |
| C | H | Cl | C | H | Cl |
| 59.89 | 5.31 | 20.78 | 59.64 | 5.36 | 20.41 |
| | | | 59.98 | 5.32 | 20.43 |

Example 5.—Bis-(para-chlorophenoxy)-n-hexyloxy-methane

Prepared in the same way as its lower homologue in Example 1, with a yield of 78%. Boiling point=180–188°/0.4 mm. $n_D^{26°}=1.5320$.

| Analysis $C_{19}H_{22}Cl_2O_3$ (369) percent | | | | | |
|---|---|---|---|---|---|
| Calculated | | | Found | | |
| C | H | Cl | C | H | Cl |
| 61.79 | 6.00 | 19.20 | 61.80 | 6.96 | 18.91 |
| | | | 61.70 | 6.14 | 18.80 |

Example 6.—Bis-(para-chlorophenoxy)-β-methoxy-ethoxy-methane

A solution of 15.2 g. (50 mmol/g.) of bis-(para-chlorophenoxy)-chloromethane and 6.8 g. (9.4 ml.) (67 mmol/g.) of triethylamine in 85 ml. of anhydrous ether is introduced into a 250 ml. three-necked flask, equipped with a mechanical stirrer, a condenser surmounted by a calcium chloride guard tube and a dropping funnel. The mixture is stirred and 7.6 g. (7.9 ml.) (100 mmol/g.) of 2-methoxy-ethanol are added, via the dropping funnel, over the course of five minutes. The mixture is stirred overnight at ambient temperature, the triethylamine hydrochloride which has precipitated is filtered off and washed with ether. The solvent is driven off in vacuo on a waterbath and the resdiue is rectified.

12.7 g. (yield=74%) of bis-(para-chlorophenoxy)-β-methoxy-ethoxy-methane, in the form of a colourless liquid which distils over at 166–170°/0.2 mm., are thus obtained. $n_D^{26°}=1.5473$.

| Analysis $C_{16}H_{18}Cl_2O_4$ (343) percent | | | | | |
|---|---|---|---|---|---|
| Calculated | | | Found | | |
| C | H | Cl | C | H | Cl |
| 55.00 | 4.34 | 19.10 | 55.92 | 4.51 | 19.57 |
|  |  |  | 56.04 | 4.78 | 19.46 |

Example 7.—Bis(para-chlorophenoxy)-β-ethoxy-ethoxy-methane

Prepared in the same way as its lower homologue in Example 6, with a yield of 70%. Boiling point=164–165°/0.15 mm. $n_D^{27°}=1.5405$.

| Analysis $C_{17}H_{18}Cl_2O_4$ (357) percent | | | | | |
|---|---|---|---|---|---|
| Calculated | | | Found | | |
| C | H | Cl | C | H | Cl |
| 57.15 | 5.07 | 19.85 | 57.21 | 5.11 | 19.69 |
|  |  |  | 57.02 | 4.98 | 19.54 |

Example 8.—Bis-(para-chlorophenoxy)-β-n-butoxy-ethoxy-methane

Prepared in the same way as its lower homologue in Example 6, with a yield of 63%. Boiling point=174–180°/0.2 mm. $n_D^{20°}=1.5242$.

| Analysis $C_{19}H_{22}Cl_2O_4$ (385) percent | | | | | |
|---|---|---|---|---|---|
| Calculated | | | Found | | |
| C | H | Cl | C | H | Cl |
| 59.23 | 5.75 | 18.40 | 59.38 | 5.95 | 18.54 |
|  |  |  | 59.21 | 6.21 | 18.53 |

Example 9.—Bis-(para-chlorophenoxy)-β-n-hexyloxy-ethoxy-methane

Prepared in the same way as its lower homologue in Example 6, with a yield of 37%. Boiling point=191–193°/0.03 mm. $n_D^{29°}=1.5122$.

| Analysis $C_{21}H_{26}Cl_2O_4$ (413) percent | | | |
|---|---|---|---|
| Calculated | | Found | |
| C | H | C | H |
| 61.02 | 6.34 | 61.78 | 7.77 |
|  |  | 61.86 | 6.89 |

Example 10.—Bis-(para-chlorophenoxy)-β-dimethyl-amino-ethoxy-methane

A solution of 15.2 g. (50 mmol/g.) of bis-(para-chlorophenoxy)-chloromethane and 6.8 g. (9.4 ml.) (67 mmol/g.) of triethylamine in 85 ml. of anhydrous ether is introduced into a 250 ml. three-necked flask, equipped with a mechanical stirrer, a reflux condenser surmounted by a calcium chloride guard tube and a dropping funnel. This solution is stirred for thirty minutes and 8.9 g. (100 mmol/g.) of freshly redistilled β-dimethylamino-ethanol are added over the course of fifteen minutes, via the dropping funnel. This mitxure is stired for seventy-two hours at ambietn temperature, and the precipitate is filtered off and washed with ether. The ether is driven off from the filtrate in vacuo on a waterbath and the oily residue is rectified in vacuo.

3 g. (yield=17%) of bis-(para-chlorophenoxy)-β-dimethylamino-ethoxy-methane in the form of a liquid which distils over at 180–190°/0.32 mm., are thus obtained. $n_D^{24°}=1.5482$.

| Analysis $C_{17}H_{19}Cl_2NO_3$ (356) percent | | | | | | | |
|---|---|---|---|---|---|---|---|
| Calculated | | | | Found | | | |
| C | H | N | Cl | C | H | N | Cl |
| 57.31 | 5.37 | 3.93 | 19.90 | 57.39 | 5.05 | 3.89 | 19.76 |
|  |  |  |  | 57.39 | 5.19 | 4.01 | 19.77 |

Example 11.—Bis-(para-chlorophenoxy)-β-diethylamine-ethoxy-methane

Prepared in the same way as its lower homologue in Example 10, with a yield of 37%. Boiling point=193–200°/0.25 mm.

| Analysis $C_{19}H_{23}Cl_2NO_3$ (384) percent | | | | | | | |
|---|---|---|---|---|---|---|---|
| Calculated | | | | Found | | | |
| C | H | N | Cl | C | H | N | Cl |
| 59.38 | 6.03 | 3.64 | 18.45 | 59.37 | 6.04 | 3.64 | 18.84 |
|  |  |  |  | 59.28 | 6.10 | 3.63 | 18.53 |

Example 12.—Bis-(para-chlorophenoxy)-β-morpholino-ethoxy-methane

Prepared in the same way as its analogue in Example 10, with a yield of 39%. Boiling point=216–218°/0.04 mm. Melting point=59–60° (hexane).

| Analysis $C_{19}H_{21}Cl_2NO_4$ (398) percent | | | | | | | |
|---|---|---|---|---|---|---|---|
| Calculated | | | | Found | | | |
| C | H | N | Cl | C | H | N | Cl |
| 57.29 | 5.31 | 3.51 | 17.80 | 57.39 | 5.25 | 3.62 | 17.73 |
|  |  |  |  | 57.10 | 5.43 | 3.61 | 17.84 |

Example 13.—Bis-(para-chlorophenoxy)-2-(β-dimethyl-amino-ethoxy)-ethoxy-methane A solution of 15.2 g. (50 mmol/g.) of bis-(para-chlorophenoxy)-chloromethane and 6.8 g. (67 mmol/g.) of triethylamine in 85 ml. of anhydrous ether is introduced into a 250 ml. three-necked flask, equipped with a mechanical stirrer, a condenser surmounted by a calcium chloride guard tube and a dropping funnel. This solution is stirred for thirty minutes and 13.3 g. (100 mmol/g.) of 2-(β-dimetheylamino-ethoxy)-ethanol are added over the course of ten minutes, via the dropping funnel. This mixture is stirred for four days; a gummy precipitate is filtered off and washed with ether; the ether is driven off from the filtrate in vacuo on a waterbath and the residue is rectified.

3.8 g. (yield=19%) of bis-(para-chlorophenoxy)-2-(β-dimethylamino-ethoxy)-ethoxy-methane, in the form of a yellow liquid which distils over at 197–199°/0.015 mm., are thus obtained. $n_D^{26°}=1.5440$.

| Analysis $C_{19}H_{23}Cl_2NO_4$ (400) percent | | | | | | | |
|---|---|---|---|---|---|---|---|
| Calculated | | | | Found | | | |
| C | H | N | Cl | C | H | N | Cl |
| 57.00 | 5.79 | 3.50 | 17.71 | 57.15 | 5.70 | 3.15 | 17.76 |
|  |  |  |  | 56.90 | 5.54 | 3.33 | 17.94 |

Example 14.—Bis-(para-chlorophenoxy)-2-(β-diethyl-amino-ethoxy)-ethoxy-methane

Prepared in the same way as its lower homologue in Example 13, with a yield of 29%. Boiling point=211–214°/0.06 mm. $n_D^{26°}$=1.5358.

| Analysis $C_{21}H_{27}Cl_2NO_4$ (428) percent | | | | | | | |
|---|---|---|---|---|---|---|---|
| Calculated | | | | Found | | | |
| C | H | N | Cl | C | H | N | C |
| 58.88 | 6.35 | 3.27 | 16.55 | 58.50 | 6.14 | 3.15 | 17.11 |
| | | | | 58.69 | 6.08 | 3.08 | 17.23 |

We claim:

1. A compound of the formula:

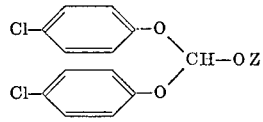

in which Z is a hydrogen atom, a straight or branched alkyl radical of 1 to 6 carbon atoms or an alkoxy-alkyl radical of the formula —$(CH_2)_n$—$OR_1$, in which $n$ is an integer from 1 to 4 and $R_1$ is a straight or branched alkyl radical of 1 to 6 carbon atoms.

2. A compound according to claim 1, which is bis-(para-chlorophenoxy)methoxy-methane.
3. A compound according to claim 1, which is bis-(para-chlorophenoxy)ethoxy-methane.
4. A compound according to claim 1, which is bis-(para-chlorophenoxy)-n-propyloxy-methane.
5. A compound according to claim 1, which is bis-(para-chlorophenoxy)-n-butyloxy-methane.
6. A compound according to claim 1, which is bis-(para-chlorophenoxy)-n-hexyloxy-methane.
7. A compound according to claim 1, which is bis-(para-chlorophenoxy)-β-methoxy-ethoxy-methane.
8. A compound according to claim 1, which is bis-(para-chlorophenoxy)-β-ethoxy-ethoxy-methane.
9. A compound according to claim 1, which is bis-(para-chlorophenoxy)-β-n-butoxy-ethoxy-methane.
10. A compound according to claim 1, which is bis-(para-chlorophenoxy)-β-n-hexyloxy-ethoxy-methane.

References Cited

UNITED STATES PATENTS

| 2,330,234 | 9/1943 | Moyle | 260—613 R |
| 2,330,340 | 9/1943 | Dieter et al. | 260—613 R |
| 3,454,584 | 7/1969 | Griot | 260—613 R |

FOREIGN PATENTS

| 495,384 | 8/1953 | Canada | 260—613 R |
| 709,658 | 6/1954 | Great Britain | 260—613 R |

OTHER REFERENCES

March et al., Jour. Economic Entomology, vol. 45 (1952), pp. 851–853.

Post, Chemistry of Aliphatic Orthoesters (1943), pp. 40 and 41.

BERNARD HELFIN, Primary Examiner

U.S. Cl. X.R.

260—570.7, 247.7 C, 293.78, 268 R, 293.72, 291; 424—341, 330